March 22, 1949.　　　W. R. BECHER　　　2,464,843
FILTER
Filed Feb. 17, 1945
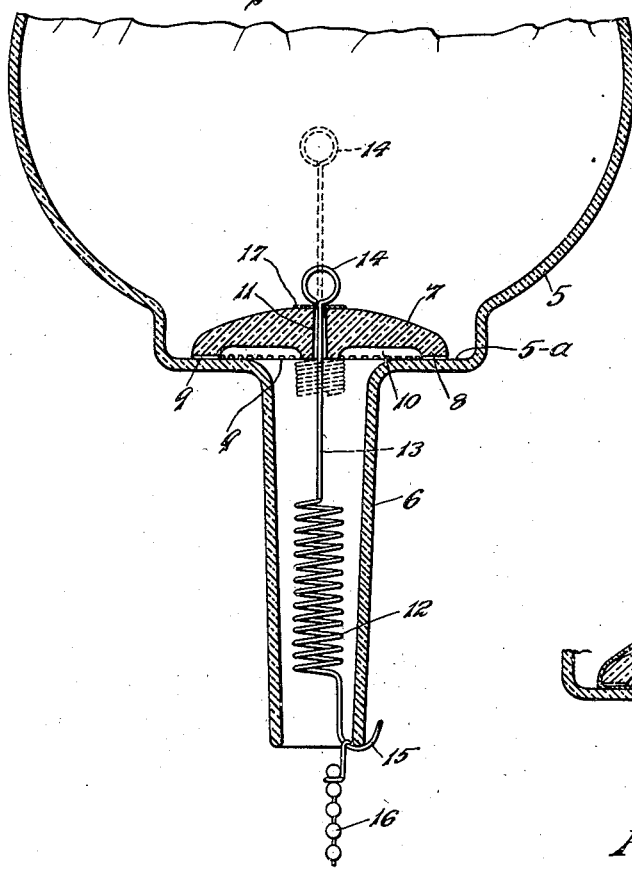
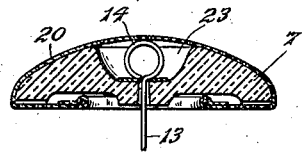
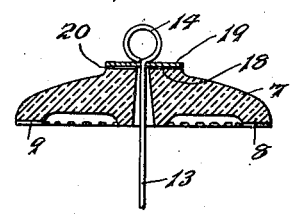
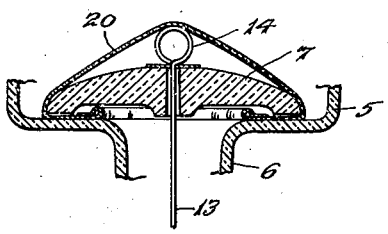
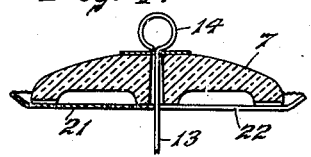
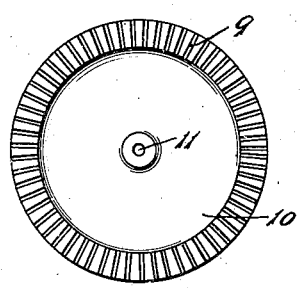
Inventor
WESLEY R. BECHER.
Louis V. Lucia.
Attorney Patented Mar. 22, 1949

2,464,843

UNITED STATES PATENT OFFICE 2,464,843

FILTER

Wesley R. Becher, Wethersfield, Conn., assignor to The Silex Company, Hartford, Conn.

Application February 17, 1945, Serial No. 578,400

1 Claim. (Cl. 210—162)

This invention relates to filters, and more particularly to such filters as are intended for coffee makers of the vacuum type and having a lower bowl with an upper bowl mounted thereon and a stem depending from said upper bowl into the lower bowl.

In the operation of such coffee makers, water is placed in the lower bowl and coffee grounds are placed in the upper bowl. When the water in the lower bowl is heated, it will rise into the upper bowl where it becomes infused with the coffee grounds therein. After the infusion operation, the brew is returned into the lower bowl through a filtering device, leaving the coffee grounds in the upper bowl.

Heretofore, certain types of filtering devices have required the use of cloth strainers therewith, which provide a high degree of filtering efficiency for separating practically all of the sediment from the brew as it passes through said filtering device. Other types of such filtering devices have been provided with strainers of paper, or other similar material which, while not as satisfactory as the cloth strainer, have proven fairly successful.

Still other types of filters have been constructed as to not require the use of either cloth or paper strainers. Such types are not as highly efficient in filtering as the other filters which use strainers but, for those who do not object to some sediment remaining in the coffee, the latter type of filter has proven fairly successful. However, those who are fastidious and desire clear coffee prefer a filter using a cloth or, at least, a paper strainer.

An object of the present invention, therefore, is to provide a filtering device for coffee makers which will operate in a highly satisfactory manner without the use of cloth or paper strainers but with which such strainer may be used when desired for the purpose of obtaining a much clearer brew than can be obtained without such strainers.

A further object of the invention is to provide a filtering device with which can be used either a washable cloth strainer of a common type that is adapted to fit over the top of the filter, or a disposable strainer in the form of a sheet of pervious material, such as cloth or paper, which is cheaply constructed so that it can be disposed of and renewed for each coffee making operation.

Further objects and advantages of the present invention will be more clearly understood from the following description and from the accompanying drawings in which—

Fig. 1 is a view in central vertical section showing my improved filter in position within the upper bowl of a coffee maker.

Fig. 2 is a bottom elevation view of said filter with the connecting spring removed therefrom.

Fig. 3 is a side view in central vertical section showing the filter with a washable cloth strainer in use therewith.

Fig. 4 is a similar view showing a disposable type of strainer in use therewith.

Fig. 5 is a plan view of said disposable strainer.

Fig. 6 is a view in central vertical section illustrating a modified form of my improved filter.

Fig. 7 is a similar view illustrating a further modified form.

As illustrated in the drawings, the numeral 5 denotes the upper bowl of a coffee maker, which is of a conventional type, having a hollow stem 6 depending therefrom.

My improved filter may consist of a filter member 7, preferably in the form of a disk having a depending annular portion 8 along the marginal edge portion of the bottom surface and which may be provided with radially extending narrow grooves 9 or may be slightly irregular so as to permit the passage of liquid between the said surface and the bottom of the upper bowl upon which the filter rests.

The said filter is also provided with a central recess 10, for the purpose to be hereinafter described, and with a central opening 11 extending therethrough.

A spring 12 is used for anchoring the said filter member in position over the mouth of the hollow stem 6. This spring is secured to the filter by means of the stem 13 which extends through the opening 11 and has a loop 14 at the end thereof connecting the spring to the member 7. If desired, the said stem 13 may be substantially longer than the thickness of the member 7 so as to permit the stem to slide through the opening 11 and serve as a suitable handle, as indicated in dotted lines in Fig. 1, while the filter member 7 is being lowered into operating position through the mouth of the upper bowl. It will be noted that the stem 7 will slide down over the stem 13 until it rests upon the coil portion of the spring 12. When the loop 14 is released, the said stem will slide down into the position illustrated in Fig. 1 and the hook 15 may then be engaged with the bottom of the stem 6 to anchor the filter member 7 firmly in position. A pendant 16 may be used for pulling a hook downwardly through the stem 6.

It will also be noted that a washer 17 is provided under the loop 14 and over the opening 11. This washer is for the purpose of permitting the use of a relatively large opening 11, that is desirable in the manufacture of the plate 7 and will also allow a certain amount of drainage therethrough and thereby cause the said filter to operate at a faster rate which is highly desirable particularly in coffee makers of the vacuum type.

The said washer 17 has a central opening, within which the stem 13 fits closely but slidably, and is seated over the opening 11 in a slightly imperfect manner; thus closing the opening 11 while still permitting a small degree of filtration. If desired, a construction such as shown in Fig. 6 may be used, wherein a seat 18 is provided for the washer 19; the said seat having a plurality of radial corrugations or grooves 20 permitting filtration therethrough in addition to the filtration which takes place between the bottom surface of said plate 7 and the surface of the bottom 5—a of the bowl on which it fits.

My improved filter will operate to a high degree of efficiency without the use of any additional straining means. However, it will readily lend itself to the use of different types of strainers should their use be desired by persons who may object to the presence of some sediment in the coffee brew. Such persons may have the choice of using several types of strainers in combination with my improved filter. As shown in Fig. 3, a cloth strainer 20, of a conventional form which is readily obtainable on the market, may be used by placing it over the filter member and the handle 14 and extending its marginal edges underneath the filter plate 7. In such cases, the peripheral marginal edge of the filter, which is commonly provided with elastic means for drawing the filter under the plate, will fit within the recess 10, as clearly illustrated, and filtration will take place through the strainer 20 and, in addition thereto, through the plate 7 in the regular manner above described.

As shown in Fig. 4, a disposable strainer 21 may be used. Such a strainer may consist simply of a pervious sheet of cloth, paper or the like which is provided with a slit 22 at one side of the center thereof to permit placing the filter around the stem 13 of the spring 12 and then drawing the plate 7 downwardly upon said sheet and thereby firmly retaining the sheet between the surface 5—a of the bottom the upper bowl and the bottom surface of the annular portion 8 of the filter plate; thus allowing the said filter to partially fill the grooves 9 when it swells, through saturation with the liquid passing therethrough, and provide additional filtration of the brew after it has been filtered through the plate 7 in the manner first described.

From the above description it will be clearly understood that I have provided a novel filter which is highly desirable, particularly for coffee makers, since it may be very satisfactorily used in several different ways, viz: without an additional strainer; with a common type of cloth strainer, for those who desire a high degree of filtration; or with a very economical form of strainer, such as a piece of paper, for those who prefer to use a disposable strainer that can be renewed for each operation of the coffee maker.

As illustrated in Fig. 7, the filter member 7 of my invention may have a recess 23 in order to receive the loop 14 of the stem 13 and permit the strainer 20 to fit smoothly over the top of the filter.

I claim:

For a coffee maker having an upper bowl with a hollow stem depending therefrom, a filter of the character described comprising a solid disk-shaped member having a central recess in the top thereof and a central opening in the bottom wall of said recess extending through said member, and spring means located below said disk for retaining said body in position by engagement with the bottom of said hollow stem; said spring means including a stem portion slidable through said opening and having a loop at the upper end thereof of a diameter greater than the diameter of said opening for securing the spring to the disk-shaped member; said loop fitting entirely within said recess to permit normal positioning of a strainer member consisting of a pervious sheet of material mounted over the disk-shaped member and loop.

WESLEY R. BECHER.

REFERENCES CITED

The following references are of record in the file of this patent:

UNITED STATES PATENTS

| Number | Name | Date |
|---|---|---|
| 1,157,778 | Humming et al. | Oct. 26, 1915 |
| 1,634,705 | Bridges | July 5, 1927 |
| 1,927,287 | Kell et al. | Sept. 19, 1933 |
| 1,967,983 | Wolcott | July 24, 1934 |
| 2,058,136 | Cory | Oct. 20, 1936 |
| 2,071,919 | Cory | Feb. 23, 1937 |
| 2,123,327 | Biberthaler et al. | July 12, 1938 |
| 2,188,493 | Becher | Jan. 30, 1940 |
| 2,234,678 | Matson | Mar. 11, 1941 |
| 2,269,956 | Renner | Jan. 13, 1942 |
| 2,289,498 | Hons | July 14, 1942 |
| 2,300,606 | Wolcott | Nov. 3, 1942 |
| 2,359,405 | Cory | Oct. 3, 1944 |
| 2,366,951 | Aycock | Jan. 9, 1945 |
| 2,370,674 | Lucia | Mar. 6, 1945 |
| 2,373,987 | Wolcott | Apr. 17, 1947 |

FOREIGN PATENTS

| Number | Country | Date |
|---|---|---|
| 29,951 | Great Britain | 1912 |
| 401,322 | Great Britain | Nov. 7, 1933 |